(12) United States Patent
Kane et al.

(10) Patent No.: US 8,151,003 B2
(45) Date of Patent: Apr. 3, 2012

(54) SYSTEM AND METHOD FOR ROUTING DATA BY A SERVER

(75) Inventors: Timothy R. Kane, Sherrill, NY (US); John I. Munson, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 1227 days.

(21) Appl. No.: 10/067,875

(22) Filed: Feb. 5, 2002

(65) Prior Publication Data
US 2003/0149791 A1    Aug. 7, 2003

(51) Int. Cl.
*G06F 15/16* (2006.01)
(52) U.S. Cl. ......................................... 709/246
(58) Field of Classification Search ............ 709/203, 709/246; 358/403
See application file for complete search history.

(56) References Cited

U.S. PATENT DOCUMENTS

| | | | |
|---|---|---|---|
| 5,374,999 A * | 12/1994 | Chuang et al. | 358/496 |
| 5,377,191 A * | 12/1994 | Farrell et al. | 370/401 |
| 5,438,508 A | 8/1995 | Wyman | |
| 5,764,279 A | 6/1998 | Ford et al. | |
| 5,826,244 A | 10/1998 | Huberman | |
| 5,873,076 A | 2/1999 | Barr et al. | |
| 5,909,570 A | 6/1999 | Webber | |
| 5,930,792 A | 7/1999 | Polcyn | |
| 6,039,248 A | 3/2000 | Park et al. | |
| 6,078,564 A * | 6/2000 | Lakshman et al. | 370/235 |
| 6,078,906 A | 6/2000 | Huberman | |
| 6,101,509 A | 8/2000 | Hanson et al. | |
| 6,144,975 A * | 11/2000 | Harris et al. | 715/500 |
| 6,178,430 B1 | 1/2001 | Cohen et al. | |
| 6,216,141 B1 | 4/2001 | Straub et al. | |
| 6,226,675 B1 | 5/2001 | Meltzer et al. | |
| 6,243,394 B1 * | 6/2001 | Deng | 370/466 |
| 6,253,071 B1 * | 6/2001 | Hard et al. | 455/404.1 |
| 6,253,322 B1 | 6/2001 | Susaki et al. | |
| 6,263,436 B1 | 7/2001 | Franklin et al. | |
| 6,266,681 B1 | 7/2001 | Guthrie | |
| 6,298,441 B1 | 10/2001 | Handelman et al. | |
| 6,311,223 B1 | 10/2001 | Bodin et al. | |
| 6,407,828 B1 * | 6/2002 | Medina | 358/462 |

(Continued)

FOREIGN PATENT DOCUMENTS

WO     WO 01/55891 A2     8/2001

(Continued)

OTHER PUBLICATIONS

Y. M. Yong, "Template-Driven Document-Exchange Specification," IBM Technical Disclosure Bulletin, vol. 39, No. 11, pp. 173-177, Nov. 1996.

(Continued)

*Primary Examiner* — Kenny Lin
(74) *Attorney, Agent, or Firm* — William E. Schiesser; Hoffman Warnick LLC

(57) ABSTRACT

The present invention provides a method and system for routing data by a server. Specifically, the present invention provides a table-drive method and system for allowing parties to send and receive data in their own data formats and transfer protocols. In routing data from a source to a destination, the present invention does not require transformation of the data to an intermediate format and/or protocol before transformation into the format and protocol of the destination.

21 Claims, 4 Drawing Sheets

U.S. PATENT DOCUMENTS

| | | | |
|---|---|---|---|
| 6,801,340 B1 * | 10/2004 | Endo | 358/403 |
| 2002/0016910 A1 * | 2/2002 | Wright et al. | 713/150 |
| 2003/0037100 A1 * | 2/2003 | Olejar et al. | 709/203 |
| 2004/0212841 A1 * | 10/2004 | Endo | 358/403 |
| 2005/0002399 A1 * | 1/2005 | Peterson | 370/392 |

FOREIGN PATENT DOCUMENTS

| | | | |
|---|---|---|---|
| WO | WO 01/55895 A2 | 8/2001 | |

OTHER PUBLICATIONS

M. Schoop and C. Quix, "DOC.COM: Combining document and communication management for negotiation support in business-to-business electronic commerce," {schoop,quic}@informatik.rwth-aachen.de, Oct. 2001.

* cited by examiner

| | SOURCE | DESTINATION | TRANSACTION TYPE | FORMAT | PROTOCOL |
|---|---|---|---|---|---|
| 62A | BU 26A | TP 28B | INVOICE | X | 1 |
| 62B | TP 28A | BU 26A | ORDER | Y | 2 |
| 62C | BU 26B | BU 26C | INVOICE | Z | 3 |

FIG. 3

SYSTEM AND METHOD FOR ROUTING DATA BY A SERVER

BACKGROUND OF THE INVENTION

1. Technical Field

The present invention generally relates to a method and system for routing data by a server. More particularly, the present invention provides a table-driven method and system for receiving data from a source and routing it to a destination, in a format and protocol of the destination.

2. Background Art

As the use of electronic commerce in business grows, the need to provide more advanced communication capabilities becomes more pervasive. Specifically, it is common in today's market for one business entity to hold communications with several external entities. Each external entity may communicate data in a different data format and/or transfer protocol. However, management of several different formats and protocols can be expensive and time-consuming. This problem is compounded when the business entity itself includes several internal business units that also communicate in a unique format and/or protocol. This not only makes communication between an internal business unit and an external entity difficult, but also communication between two internal business units. For example, business unit "A" using format "W" and protocol "X" might need to communicate with business unit "B" that uses format "Y" and protocol "Z."

Heretofore, attempts have been made to provide systems for transforming and routing data between disparate systems. Such attempts, however, fail to accommodate all format and protocol types. For example, many existing systems require parties to communicate in a common format and/or protocol. This could require that the parties make expensive modifications to their existing communication systems. Alternatively, some existing systems transform communications from a source into an intermediate format before transforming to into the format of the destination. This intermediary transformation step, often results in increased data errors. Accordingly, no existing system allows parties to efficiently communicate in their own format and/or protocol.

Other features lacking in existing systems include error detection, communication tracking and report generation. Error detection is important as it would prevent erroneous communications from being routed to a destination. Communication tracking would allow communications between parties to be tracked to ensure that no communications are lost. Report generation would allow a system administrator to view reports related to communications through the system to identify potential problems and take corrective action.

In view of the foregoing, there exists a need for a method and system for routing data by a server. In addition, a need exists for such a method and system that allows parties to send and receive data in their own respective formats and/or protocols. A further need exists for communication exchange to take place without transformation to an intermediate format. Still yet, a need exists for a method and system that includes error detection, communication tracking and report generation.

SUMMARY OF THE INVENTION

The present invention provides a method and system for routing data by a server. Specifically, two parties can communicate in their own data format and transfer protocol without having to make modifications to their existing system, or have their communications transformed into an intermediary format. Under the present invention, a table is defined that includes details of all communications between parties through the server. The details include communication sources, destinations, transaction types, formats and protocols. Thus, when data is received from a source, the table is referenced and the format and protocol corresponding to the destination are identified. The data is then converted into the format of the destination, and routed thereto using the corresponding protocol. The present invention also provides for error detection, communication tracking and report generation.

According to a first aspect of the present invention, a method for routing data by a server is provided. The method comprises the steps of: (1) providing an application on the server; (2) providing a table of formats and protocols on the server, wherein the table is accessible by the application; (3) receiving data having a destination and a transaction type, from a source, on the server; (4) retrieving, from the table, a format for transforming the data and a protocol for communicating the data based on the destination, the transaction type and the source; and (5) the application transforming the data into the retrieved format, and routing the transformed data to the destination using the retrieved communication protocol.

According to a second aspect of the present invention, a method for routing data by a server is provided. The method comprises the steps of: (1) providing a communication application on the server; (2) entering a table of formats, protocols, sources, destinations and transaction types on the server, wherein the table is accessible by the application; (3) receiving data having a destination and a transaction type, from an identified source, on the server; (4) detecting errors in the data based upon omissions in the data; (5) retrieving from the table a format for transforming the data and a protocol for communicating the data, based on the destination, the transaction type and the source; and (6) the application transforming the data into the retrieved format, and routing the transformed data from the server to the destination using the retrieved communication protocol.

According to a third aspect of the present invention, a system for routing data by a server is provided. The system comprises: (1) a table system for providing a table having formats and protocols; (2) a data reception system for receiving data from a source, the data having a destination and a transaction type; (3) a retrieval system for retrieving a format for transforming the data and a protocol for communicating the protocol from the table based upon the source, the destination and the transaction type; (4) a transformation system for transforming the data into the retrieved format; and (5) a routing system for routing the transformed data to the destination using the retrieved protocol.

According to a fourth aspect of the present invention, a program product stored on a recordable medium for routing data by a server is provided. When executed, the program product comprises: (1) program code for providing a table having formats and protocols; (2) program code for receiving data from a source, the data having a destination and a transaction type; (3) program code for retrieving a format for transforming the data and a protocol for communicating the protocol from the table based upon the source, the destination and the transaction type; (4) program code for transforming the data into the retrieved format; and (5) program code for routing the transformed data to the destination using the retrieved protocol.

Therefore, the present invention provides a method and system for routing data by a server.

BRIEF DESCRIPTION OF THE DRAWINGS

These and other features of this invention will be more readily understood from the following detailed description of the various aspects of the invention taken in conjunction with the accompanying drawings in which:

FIG. 3 depicts an exemplary table according to the present invention.

Figure 1:
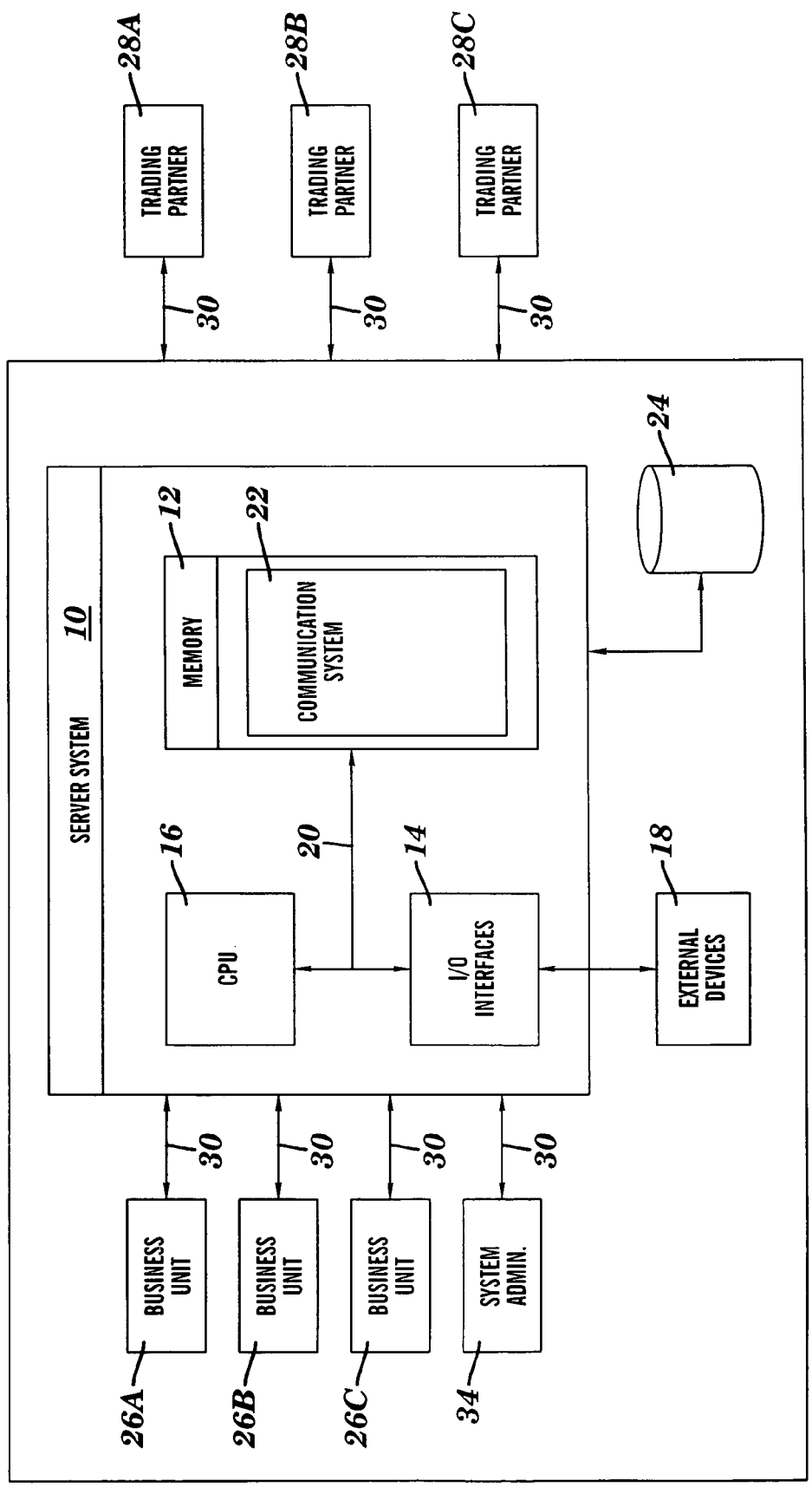
FIG. 1 depicts a server system having a communication system according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a method and system for routing data by a server. Specifically, the present invention provides a method and system for receiving data from a source, referencing a table to identify a data format and transfer protocol of the destination, transforming the data into the identified format and routing the data to the destination using the identified protocol.

Referring now to FIG. 1, server system 10 having communication system 22 according to the present invention is shown. Under the present invention parties such as internal business units 26A-C and external trading partners 28A-C can communicate with each other in their own data formats and transfer protocols.

As depicted, server system 10 generally comprises memory 12, input/output (I/O) interfaces 14, a central processing unit (CPU) 16, external devices/resources 18, bus 20, and database 24. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including speakers, a CRT, LED screen, hand-held device, keyboard, mouse, voice recognition system, speech output system, printer, monitor, facsimile, pager, etc. Bus 20 provides a communication link between each of the components in the server system 10 and likewise may comprise any known type of transmission link, including electrical, optical, wireless, etc. In addition, although not shown, additional components, such as cache memory, communication systems, system software, etc., may be incorporated into server system 10.

Database 24 provides storage for information necessary to carry out the present invention. Such information could include, among other things, a table and tracking statistics. Database 24 may include one or more storage devices, such as a magnetic disk drive or an optical disk drive. In another embodiment database 24 includes data distributed across, for example, a local area network (LAN), wide area network (WAN) or a storage area network (SAN) (not shown). Database 24 may also be configured in such a way that one of ordinary skill in the art may interpret it to include one or more storage devices. Moreover, it should be understood that database 24 could alternatively exist within server system 10.

Under the present invention, parties such as internal business units 26A-C and external trading partners 28A-C will use communication system 22 to exchange data (i.e., via server system 10) using their own data formats and transfer protocols. To this extent, for example, business unit 26A can communicate with other business units 26B-C or with trading partners 28A-C. It should be understood that since server system 10 facilitates communication among business units 26A-C and trading partners 28A-C, server system 10 also includes any necessary hardware (e.g., routing hardware).

As depicted, communication with server system server 10 occurs via communication links 30. Communications links 30 can include a direct hardwired connection (e.g., serial port), or an addressable connection such as a remote system in a client-server environment. In the case of the latter, the client and server may be connected via the Internet, wide area networks (WAN), local area networks (LAN) or other private networks. The server and client may utilize conventional token ring connectivity, Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

It is understood that the present invention can be realized in hardware, software, or a combination of hardware and software. Moreover, server system 10 according to the present invention can be realized in a centralized fashion in a single computerized workstation, or in a distributed fashion where different elements are spread across several interconnected systems (e.g., a network). Any kind of computer/server system(s)—or other apparatus adapted for carrying out the methods described herein—is suited. A typical combination of hardware and software could be a general purpose (computer) system with a computer program that, when loaded and executed, controls server system 10 such that it carries out the methods described herein. Alternatively, a specific use (computer) system, containing specialized hardware for carrying out one or more of the functional tasks of the invention could be utilized. The present invention can also be embedded in a computer program product, which comprises all the features enabling the implementation of the methods described herein, and which—when loaded in a (computer) system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 2:
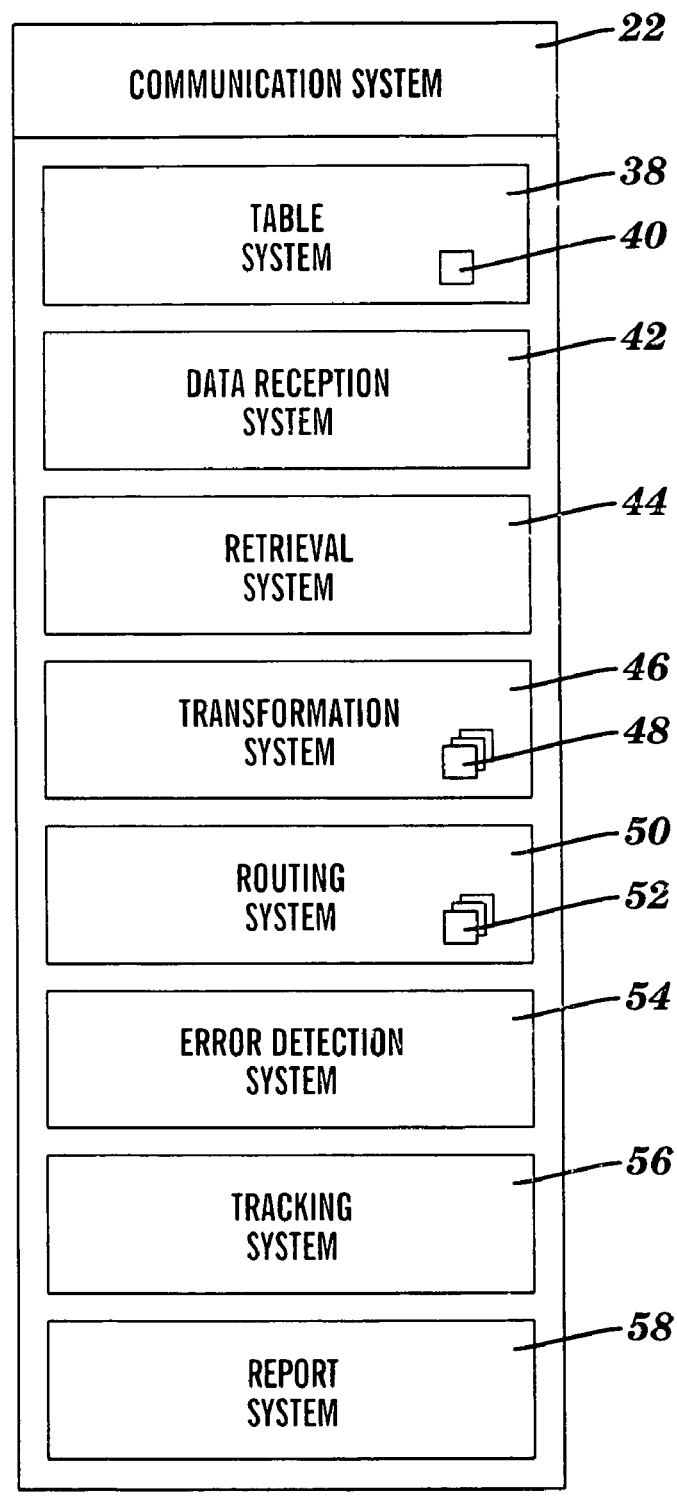
FIG. 2 depicts the communication system of FIG. 1.

Referring now to FIG. 2, communication system 22 is shown in greater detail. As depicted, communication system 22 includes table system 38 having table interface 40, data reception system 42, retrieval system 44, transformation system 46 having transformation applications 48, routing system 50 having routing applications 52, error detection system 54, tracking system 56 and report system 58. It should be understood that, as indicated above, each system of communication system 22 can include hardware, software or a combination of hardware and software necessary for carrying out the features to be described below.

Table system 38 provides an interface 40 for providing (e.g., receiving or defining) a table of information. Specifically, communication system 22 of the present invention is table-driven so that data can be communicated to business units 26A-C or trading partners 28A-C in their respective formats and protocols. In one embodiment, all necessary information is contained directly in the table. For example, if business unit 26A wished to communicate invoice data to trading partner 28A, an entry in the table would identify business unit 26A as the source, trading partner 28A as the destination and invoice as the transaction type. Moreover, the entry would identify the data format and transfer protocol used by trading partner 28A. Thus, the table could contain all information necessary to communicate the data according to the format and protocol of trading partner 28A. In another embodiment, instead of formats and protocols, the table could contain the names of transformation and routing applications 48 and 52 that will enable the communication of data to the destination in the appropriate format and protocol.

In either event, the table could be provided predefined by a system administrator 24 or the like and stored in database 24. Alternatively, the table could be initially defined via interface 40 of table system 38. In either event, interface 40 could later be used to update the table.

Referring to FIG. 3, an exemplary table 60 is shown in greater detail. As depicted, table 60 includes entries 62A-C. Each entry 62A-C corresponds to communication from one particular source to one particular destination. For example, entry 62A corresponds to communication from internal business unit 26A to trading partner 28B. Entry 62B could correspond to communication from trading partner 28A to internal business unit 26A. Entry 62C corresponds to communication from internal business unit 26B to internal business unit 26C. Each entry 62A-C indicates the source 64 of the data communication, the destination 66 of the data communication, the transaction type 68, the data format 70 used by the destination and the protocol 72 used by the destination.

Referring back to FIG. 2, data is received by data reception system 42 from a source. Data reception system 42 will then analyze the data and determine the source, the destination, and the transaction type thereof. Based on this information, retrieval system 44 will identify/retrieve from table 60 the corresponding format and protocol information. For example, if the incoming data indicated a source 64 of internal business unit 26A, a destination 66 of trading partner 26B and a transaction type of invoice, entry 62A would be identified and the corresponding format 70 of "X" and protocol 72 of "1" would be retrieved. It should be understood that in some embodiments, the necessary format and protocol information could be retrieved based only upon source and destination (not transaction type). Transaction type would be required where table 60 has multiple entries with the same source and destination. This would occur where the same source communicates different data types to the same destination. For example, the format used by the destination for invoice data could be different than the format used for order data. In this case, a separate entry would exist for each different transaction type to the destination.

Once the format and protocol information has been retrieved from table 60, transformation system 46 will transform the data into the format used by the destination. To this extent, transformation system 46 could optionally include one or more transformation applications 48. In the case of multiple transformation applications 48, a separate application could be provided for each distinct format. For example, a first transformation application 48 could convert data to format "X," while a second transformation application 48 converts data to format "Y." In any event, instead of identifying a particular format 70 as shown in FIG. 2, table 60 could identify a particular transformation application 48 that will complete the transformation.

Once the data has been transformed to the format of the destination, routing system 50 will ensure that the data is routed to the correct destination using the correct (i.e., the destination's) protocol. Similar to transformation system 46, routing system 50 can include one or more routing applications 52. In the case multiple routing applications 52, a separate routing application 52 could be provided for each distinct protocol. For example, a first routing application 52 could route the data to the destination according to protocol "1," while a second routing application 52 could route the data according to protocol "2." In any event, table 60 could alternatively identify a particular routing application 52 instead of a particular protocol 72.

It should be appreciated that the present invention is able to accommodate any type of format and/or protocol that could be used by a destination. For example, the present invention could provide: (1) server-server routing of data using RosettaNet or other protocol (e.g., for communication between an internal business unit and an external trading partner); (2) server-browser routing using extended markup language (XML) (e.g., for communication from an internal business unit to an external trading partner); or (3) internal business unit to internal business unit routing.

Based on the desired protocol of the destination, it should be understood that the transformed data maybe sent directly to the destination or displayed for the destination. For example, if the destination wishes to directly receive the data on a server to server basis via RosettaNet, the corresponding routing application 52 would effect this routing requirement. Conversely, if the destination is to receive the data by viewing it via a web interface, the data may be routed to a web interface application 52, which will display the data for viewing by the destination over the web.

The use of a table as proposed under the present invention allows any data format and transfer protocol to be accommodated without having to transform data into an intermediate format and/or protocol. Specifically, all parties can send and receive data in their native formats and protocols. To add parties to the system or to change the format or protocol of an existing party, only table 60 need be revised.

Error detection system 54 detects errors in incoming data based on omissions in the data. Specifically, error detection system 54 will analyze the received data to identify any blank fields that should be populated. For example, if invoice data is received from internal business unit 26A that fails to identify a destination, an error message/alert will be generated and the data will not be transformed or routed. To this extent, error detection system 54 could be programmed by an administrator 34 (FIG. 1) to be as sophisticated as desired. For example, error detection system could be programmed to identify fields of data in which data population mandatory and/or conditional. Thus, if population of the job number filed was mandatory for invoice data, and received invoice data failed to identify a job number, error detection system 54 would generate an alert. Similarly, if population of the job number field was conditional on population of the billing number field, and the billing number field was populated but the job number field was not, an alert would be generated.

Tracking system 56 provides for tracking of all communication through server system 10. For example, when data is received by server system 10, a record will be made in database 34. When the data is transformed and routed, the record will be updated. Then, when the data is received by the destination, the record will be updated again. This communication tracking helps ensure that data is not lost or dropped while being sent to the destination. It also allows inefficiencies to be identified. For example, if data format transformation is being delayed, an addition transformation application 48 could be added.

Report system 58 allows reports of communication system 22 performance to be generated. This not only includes the quantity and timing of communications through server system 10, but also errors detected, sources of communications, destinations of communications, etc. Thus, the report could identify, for example, how many communications each source sent and/or each destination received.

Figure 4:
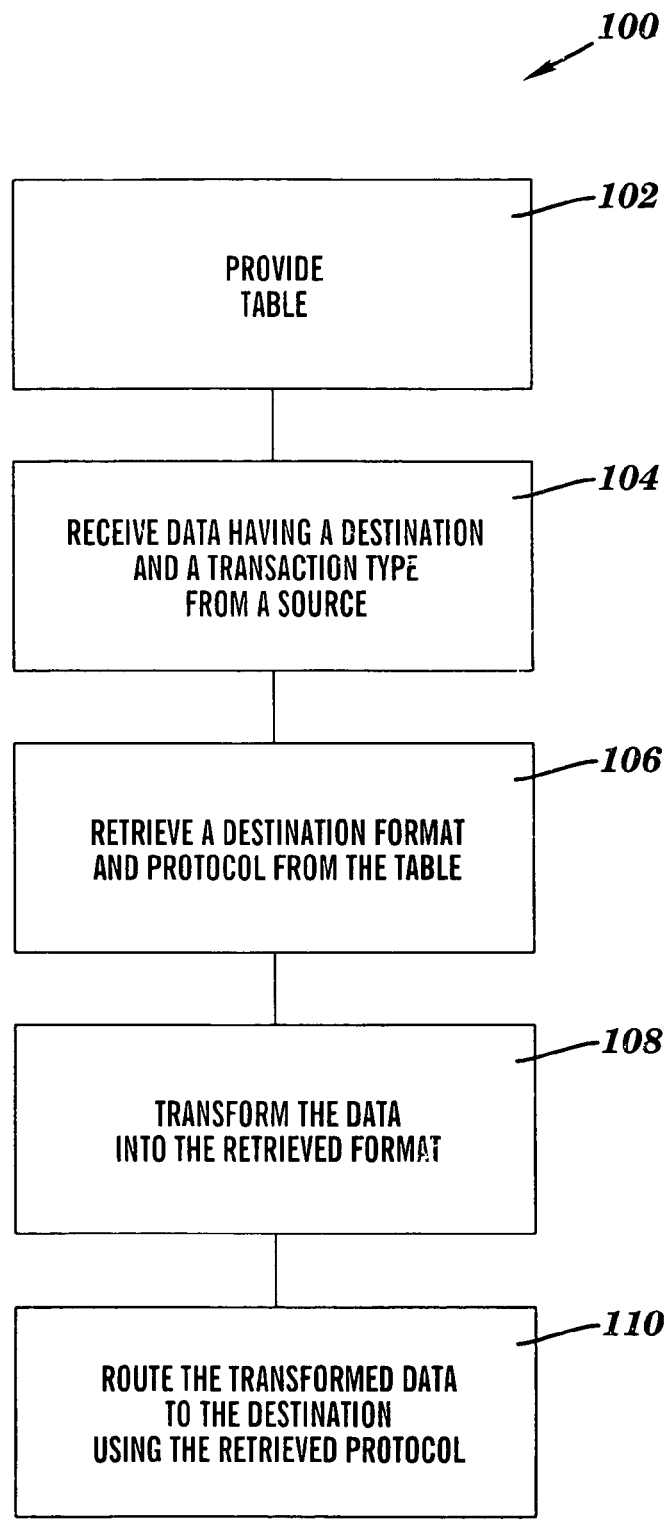
FIG. 4 depicts an exemplary flow diagram according to the present invention.

Referring now to FIG. 4, a flow diagram 100 according to the present invention is shown. First step 102 is to provide a table. As indicated above, the table could be provided predefined, or it could be defined via interface 40. The next step 104 is to receive data having a destination and a transaction type from the source. Once the data has been received, the format and protocol of the destination will be retrieved from the table 106. As described above, retrieval could be based upon the source, the destination and the transaction type. Next, the data will be transformed into the format of the destination 108. Finally, the data will be routed to the destination using the retrieved protocol 110.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for routing data by a server, comprising the steps of:
   providing an application on the server;
   providing a table of formats and protocols on the server, wherein the table is accessible by the application, wherein the table contains a plurality of formats and protocols;
   receiving, on the server, data to be routed from a source to a destination, the data having the destination and a transaction type that defines a content of the data;
   retrieving, from the table, a format, distinct from the transaction type, of the plurality of formats for transforming the data and a protocol of the plurality of protocols for communicating the data, the format that is retrieved being based on the destination, the transaction type and the source;
   the application transforming the data into the retrieved format, and routing the transformed data to the destination using the retrieved communication protocol,
   receiving, on the server, alternate data to be routed from an alternate source to an alternate destination, the alternate data having the alternate destination and an alternate transaction type that defines a content of the alternate data;
   retrieving, from the table, a different format of the plurality of formats for transforming the alternate data and a different protocol of the plurality of protocols for communicating the alternate data, the different format that is retrieved being based on the alternate destination, the alternate transaction type and the alternate source; and
   the application transforming the alternate data into the retrieved different format, and routing the transformed alternate data to the alternate destination using the retrieved different communication protocol.

2. The method of claim 1, provided table further includes sources, destinations and transaction types.

3. The method of claim 1, further comprising the step of identifying the source, prior to the retrieving step.

4. The method of claim 1, further comprising the step of the application detecting errors in the retrieved data based upon omissions in the data.

5. The method of claim 1, further comprising the step of tracking data communication between the source and the destination.

6. The method of claim 1, further comprising the step of generating a report based upon data communications and detected errors.

7. A method for routing data by a server, comprising the steps of:
   providing a communication application on the server;
   entering a table of formats, protocols, sources, destinations and transaction types on the server, wherein the table is accessible by the application, wherein the table contains a plurality of formats and protocols;
   receiving, on the server, data to be routed from an identified source to a destination, the data having the destination and a transaction type that defines a content of the data;
   detecting errors in the data based upon omissions in the data;
   retrieving from the table a format, distinct from the transaction type, of the plurality of formats for transforming the data and a protocol of the plurality of protocols for communicating the data, the format that is retrieved being based on the destination, the transaction type and the source;
   the application transforming the data into the retrieved format, and routing the transformed data from the server to the destination using the retrieved communication protocol,
   receiving, on the server, alternate data to be routed from an alternate identified source to an alternate destination, the data having the alternate destination and an alternate transaction type that defines a content of the alternate data;
   detecting errors in the alternate data based upon omissions in the alternate data;
   retrieving from the table a different format of the plurality of formats for transforming the alternate data and a different protocol of the plurality of protocols for communicating the alternate data, the different format that is retrieved being based on the alternate destination, the alternate transaction type and the alternate source; and
   the application transforming the alternate data into the different retrieved format, and routing the transformed alternate data from the server to the alternate destination using the retrieved different communication protocol.

8. The method of claim 7, further comprising the step of tracking data communication from the source to the destination.

9. The method of claim 8, further comprising the step of generating a report based upon data communications and detected errors.

10. A system for routing data by a server, comprising:
    a table system for providing a table having a plurality of formats and protocols;
    a data reception system for receiving data from a source to be routed to a destination, the data having a destination and a transaction type that defines a content of the data and for receiving alternate data from an alternate source to be routed to an alternate destination, the data having the alternate destination and an alternate transaction type that defines a content of the alternate data;

a retrieval system for retrieving a format, distinct from the transaction type, of the plurality of formats for transforming the data and a protocol of the plurality of protocols for communicating the data from the table, the format that is retrieved being based upon the source, the destination and the transaction type and for retrieving a different format of the plurality of formats for transforming the alternate data and a different protocol of the plurality of protocols for communicating the alternate data from the table, the different format that is retrieved being based upon the alternate source, the alternate destination and the alternate transaction type;

a transformation system for transforming the data into the retrieved format and for transforming the alternate data into the retrieved different format; and a routing system for routing the transformed data to the destination using the retrieved protocol and for routing the transformed alternate data to the alternate destination using the retrieved different protocol.

11. The system of claim 10, wherein the table further includes sources, destinations and transaction types.

12. The system of claim 10, wherein the data reception system further identifies the source.

13. The system of claim 10, further comprising an error detection system for detecting errors in the received data based upon omissions.

14. The system of claim 10, further comprising a tracking system for tracking data communication between the source and the destination.

15. The system of claim 10, further comprising a report system for of generating a report based upon data communications and detected errors.

16. A program product stored on a computer readable storage device for routing data by a server, which when executed, comprises:

program code for providing a table having a plurality of formats and protocols;

program code for receiving data from a source to be routed to a destination, the data having a destination and a transaction type that defines a content of the data and for receiving alternate data from an alternate source to be routed to an alternate destination, the data having the alternate destination and an alternate transaction type that defines a content of the alternate data;

program code for retrieving a format, distinct from the transaction type, of the plurality of formats for transforming the data and a protocol of the plurality of formats for communicating the protocol from the table, the format that is retrieved being based upon the source, the destination and the transaction type and for retrieving a different format of the plurality of formats for transforming the alternate data and a different protocol of the plurality of protocols for communicating the alternate data from the table, the format that is retrieved being based upon the alternate source, the alternate destination and the alternate transaction type;

program code for transforming the data into the retrieved format and for transforming the alternate data into the retrieved different format; and program code for routing the transformed data to the destination using the retrieved protocol and for routing the transformed alternate data to the alternate destination using the retrieved different protocol.

17. The program product of claim 16, wherein the table further includes sources, destinations and transaction types.

18. The program product of claim 16, wherein the program code for receiving data further identifies the source.

19. The program product of claim 16, further comprising program code for detecting errors in the received data based upon omissions.

20. The program product of claim 16, further comprising program code for tracking data communication between the source and the destination.

21. The program product of claim 16, further comprising program code for generating a report based upon data communications and detected errors.

\* \* \* \* \*